United States Patent Office 2,935,592
Patented May 3, 1960

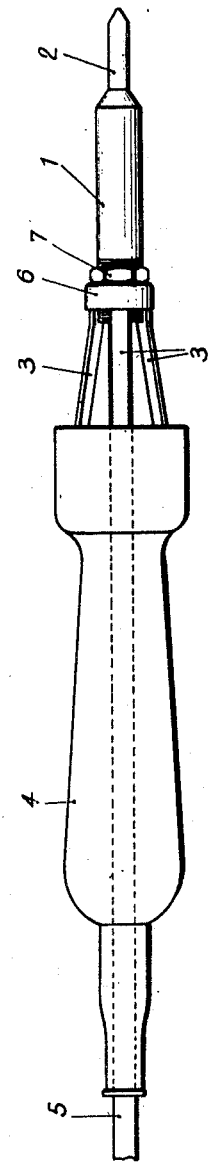
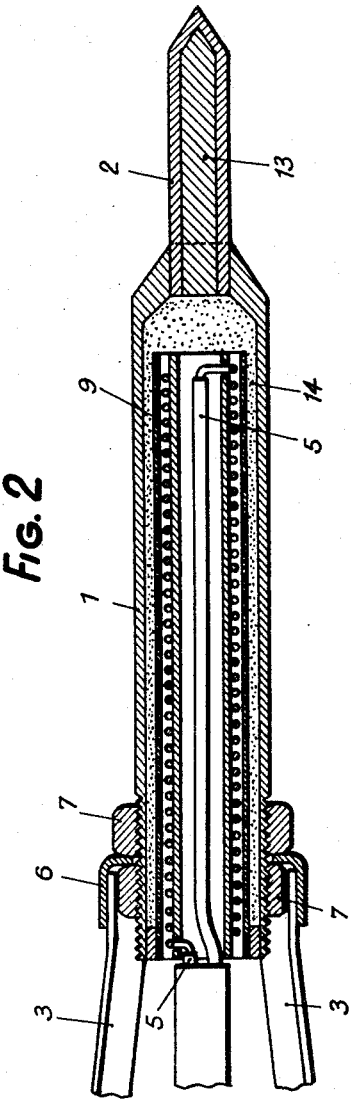

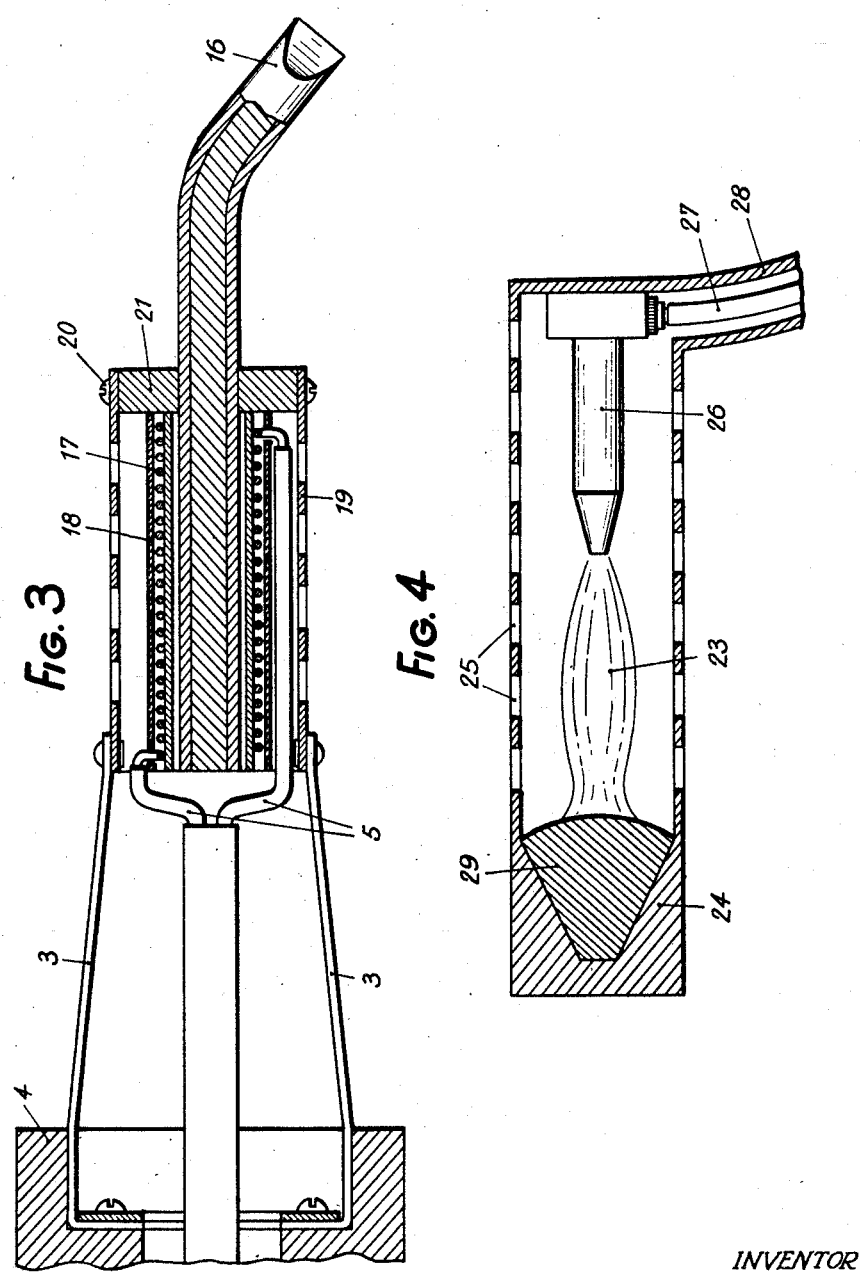

2,935,592

SOLDERING BITS

Marie Charles Alfred Thuillier, Bois d'Arcy, France

Application April 9, 1957, Serial No. 651,656

2 Claims. (Cl. 219—26)

The present invention relates to soldering bits, and more particularly to soldering bits for the application of tin solder, either of the hand or mechanical type.

Though not exclusively, the invention is concerned with soldering tools, the bit, bolt, or body of which is directly heated either by the combustion of gases or by the heat derived from an electric energy (arc, imperfect contact, resistor, induction, high frequency, ultrasonic vibrations, and so on).

The soldering bits or bolts are generally made of copper, i.e. a relatively soft metal which is readily oxydised by the action of heat. This results, of course, into rapid wear and soiling of the soldering bits which are constantly subjected to the action of heat and in frictional engagement with the parts to be soldered.

Substitutes for copper have already been proposed, particularly copper alloys, but none of them is able to secure satisfactory results as far as thermal conductibility, freedom from oxydation, hardness, and uniform conditions of operation are required simultaneously.

Iron electrolytic plating over a copper soldering bolt makes it possible to improve the heat conductibility, the resistance to soiling and uniform operation, but, however, it has the drawback of providing a bolt liable to wear rapidly. Indeed, iron, particularly iron deposited by an electrolytic method, is a relatively soft and physically unstable metal. The apparatus in which soldering bolts are mounted bring their temperature up to near 300° C. at which the resistance of iron is maximum while its elongation is minimum, that is to say under the worst conditions of mechanical work and resistance against abrasion. Furthermore, successive expansion and contraction of the supporting metal, either copper or other, together with the softness of the latter in a hot state soon lead to a deterioration of the iron layer.

The object of the invention is to remove all the drawbacks of the structures of the existing soldering bits, in providing a soldering bit adapted fully to withstand friction and heat, and which has a high thermal conductibility and reliable uniform properties while in use.

The gist of the invention consists in making portion of the soldering bit, which is adapted to be in engagement with the parts to be soldered, of a relatively hard metal, preferably steel. Indeed, the carbon contained in steel yields a physico-chemical stability which is not to be found in iron, it prevents the metal from being electrolytically corroded, reduces the oxydation of the latter and affords a hardness which makes it capable of withstanding repeated friction for a considerable length of time.

Such hardness, as well as all the properties desired for a given duty are, furthermore, readily obtained in steel and controlled at will by adding metallic and/or mineral components, while this is not possible when electrolytic processes are utilized.

It is also possible, instead of steel, to use other suitable hard metals for making the portion of the soldering bit adapted to engage the parts to be soldered.

According to the particular needs, the thermal conductibility of the soldering bit may be increased or controlled at will by providing a heat conducting body (metal or mineral) or a heat accumulator (silver, copper, brass, aluminum, magnesia, etc.) outwardly or inwardly of the steel or other metal used for the bit. Furthermore, radiating heat may be reduced at will by providing a suitable outer sheath.

Further objects and advantages of the invention will be apparent to those skilled in the art, from a consideration of the following description of several embodiments of the invention shown by way of example, in the accompanying drawings, in which:

Fig. 1 is an elevational view of an electric soldering bolt according to the invention;

Fig. 2 is, on a larger scale, an axial section of the soldering bit of the soldering bolt of Fig. 1;

Fig. 3 is an axial section of a modification of the soldering bolt of Fig. 1;

Fig. 4 shows, also in axial section, another embodiment of a soldering bolt heated by a gas flame.

The electric soldering tool illustrated in Fig. 1 comprises a hollow bolt 1 and a soldering bit 2 secured to bolt 1. The bolt 1 is supported by a plurality (four in the example illustrated) of strips 3 rigid with a hollow handle 4 through which extends a supply cable 5 adapted to carry electric current to a heating resistor housed within the hollow bolt 1.

The rear end portion of the bolt is screw-threaded and inserted in an annular member 6 (Fig. 2) clamped between two nuts 7 mounted on said screw-threaded portion.

The bolt 1 is constituted by a tubular body made of brass or any other suitable metal having high thermal conductibility. The heating resistor 9 is lodged within said tubular body and connected to the supply cable 5.

The outer end of the bolt 1 has a central opening in which is secured, as by brazing, the soldering bit 2 which is made of steel or any other suitable metal, such as nickel, for instance. The end portion of this soldering bit is bevelled or pointed in the same manner as in the usual soldering coppers.

The soldering bit 2, therefore, may possess all the required properties of resistance against friction with the parts to be soldered, as well as a great resistance against oxydation. Furthermore, the body of the bolt which is made of a metal having good thermal properties ensures a thorough transmission of heat from the resistor 9 to the soldering bit 2.

The transmission of heat between the resistor and the soldering bit may be further improved by having the interior of the latter and, if need be, also the interior of the bolt, lined or filled with a metal having still better thermal properties, such as silver for instance, as indicated at 13 and 14, respectively, in the drawing.

According to the properties required for a given operation, other metallic or mineral components may be added to the carbon steel according to conventional methods and processes of the metallurgical industry.

Furthermore, the soldering bit 2 might be constituted by a solid piece of metal, namely steel, for instance, provided that its shape and dimensions make it possible to make it have a thermal conductibility sufficiently high under the operational conditions involved. This may be obtained, for instance, by increasing the cross-section and reducing the thickness thereof.

As an example the composition of a steel suitable for making a soldering bit is the following: carbon 0.13%, sulphur 0.18%, manganese 0.6%, phosphor 0.06%, and iron the balance.

The soldering bit may even be made of hardened steel, for instance of the following composition: carbon 1.15%, silicium 0.20%, manganese 0.30%, chromium 1%, molybdenum 0.1%, and iron the balance of it. Under such conditions, the soldering bit may be shaped into another tool such as a screw-driver, or a scraper for instance, and used as such without any detrimental effect on the soldering bit.

In the modification illustrated in Fig. 3, the soldering bit 16, which is bent in the example, has an exension located inside the heating resistor 17. It is constituted by a generally tubular member made of steel, or other metal adapted to withstand friction, and filled-up with a metal having a high thermal conductibility, such as silver, copper, or brass, for instance. The resistor 17 is surrounded with a sheath of asbestos 18 and the assembly is housed within an outer sleeve 19 made of steel, for instance, preferably foraminated, and secured by one end thereof, as by means of screws 20 to the strips 3 which are rigid with the handle 2, whereas the other end of the sleeve is obturated by an annular member 21 made rigid with the soldering bit 16 as by means of soldering, brazing, or any other suitable means, such as screws for instance.

In the embodiments hereinabove described, it has been assumed that the soldering bit was heated by means of a resistor, but as already stated in the main patent, the invention is also applicable to soldering bits heated by any other means. Thus, in Fig. 4, there is diagrammatically represented a soldering bolt heated by means of a gas flame. The bolt is constituted by a tubular steel member 24, one end of which is bevelled in a conventional manner so as to form the soldering bit, and the cylindrical wall of which is foraminated as indicated at 25 for instance. The rear portion of the bolt 24 carries a gas burner 26 supplied by a pipe 27 housed within the handling rod 28, or extending thereof. Within the soldering bit, is a block of silver 29 subjected to the action of the heating flame 23. In this manner the flame does not heat up directly the steel soldering bit. If such conditions were not secured, the steel bit would be immediately oxydized. Here again, the soldering bit has the desired mechanical resistance while being readily heated by virtue of the high heat conductivity of the silver which transmits to said bit the heat developed by the flame 23.

As many changes could be made in the above construction, and many widely different embodiments of this invention could be made without departing from the scope of the claims it is intended that all matter contained in the above description or shown in the accompanying drawings shall be interpreted as illustrative and not in a limiting sense.

What is claimed as new and desired to be secured by Letters Patent is:

1. In a soldering tool, a soldering bit of elongated form having a reduced cross section at one end for engagement with the work to be soldered, a metal bolt supporting the soldering bit at its other end and in heat exchange relationship with it, and means carried by the bolt for heating the soldering bit, the soldering bit having a steel body having the composition .13% carbon, .18% sulfur, .6% manganese, .06% phosphorous, and the balance iron, the steel body being filled with silver.

2. In a soldering tool, a soldering bit of elongated form having a reduced cross section at one end for engagement with the work to be soldered, a metal bolt supporting the soldering bit at its other end and in heat exchange relationship with it, and means carried by the bolt for heating the soldering bit, the soldering bit having a steel body of hardened steel having the composition 1.15% carbon, .20% silica, .30% manganese, 1% chromium, .1% molybdenum, and the balance iron, the steel body being filled with silver.

References Cited in the file of this patent

UNITED STATES PATENTS

| | | |
|---|---|---|
| 1,350,181 | Remane | Aug. 17, 1920 |
| 1,667,618 | Abbott | Apr. 24, 1928 |
| 1,961,496 | Holmes | June 5, 1934 |
| 1,985,492 | Frohmuth et al. | Dec. 25, 1934 |
| 1,993,781 | Hampton et al. | Mar. 12, 1935 |
| 2,324,802 | Powell | July 20, 1943 |
| 2,523,638 | Tice | Sept. 26, 1950 |
| 2,542,629 | Clawson | Feb. 20, 1951 |
| 2,552,253 | Brown | May 8, 1951 |